United States Patent
Nishimura et al.

(10) Patent No.: US 9,497,348 B2
(45) Date of Patent: Nov. 15, 2016

(54) DOCUMENT OUTPUT METHOD FOR OUTPUTTING DOCUMENTS ASSOCIATED WITH AN EVENT

(71) Applicants: Tatsuo Nishimura, Tokyo (JP); Tohru Sasaki, Kanagawa (JP); Yukinori Ishii, Kanagawa (JP); Itaru Kodaira, Kanagawa (JP); Atsushi Okazato, Kanagawa (JP); Tomohiro Kuroyanagi, Kanagawa (JP); Masaki Tasaka, Kanagawa (JP); Makoto Sasaki, Kanagawa (JP)

(72) Inventors: Tatsuo Nishimura, Tokyo (JP); Tohru Sasaki, Kanagawa (JP); Yukinori Ishii, Kanagawa (JP); Itaru Kodaira, Kanagawa (JP); Atsushi Okazato, Kanagawa (JP); Tomohiro Kuroyanagi, Kanagawa (JP); Masaki Tasaka, Kanagawa (JP); Makoto Sasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/659,802

(22) Filed: Mar. 17, 2015

(65) Prior Publication Data
US 2015/0271353 A1 Sep. 24, 2015

(30) Foreign Application Priority Data

Mar. 18, 2014 (JP) .................................. 2014-055113
Mar. 9, 2015 (JP) .................................. 2015-045981

(51) Int. Cl.
*H04N 1/00* (2006.01)
*H04N 1/21* (2006.01)

(52) U.S. Cl.
CPC ...... *H04N 1/2179* (2013.01); *H04N 2201/218* (2013.01)

(58) Field of Classification Search
None
See application file for complete search history.

(56) References Cited

U.S. PATENT DOCUMENTS

| | | | |
|---|---|---|---|
| 6,424,429 B1* | 7/2002 | Takahashi | H04N 1/00204 358/1.16 |
| 2002/0001104 A1* | 1/2002 | Shima | G06K 15/00 358/442 |
| 2006/0044607 A1* | 3/2006 | Kato | G06F 3/1222 358/1.15 |
| 2006/0282418 A1* | 12/2006 | Fukumoto | G06F 3/1204 |
| 2007/0002352 A1* | 1/2007 | Ushio | G06F 17/211 358/1.13 |
| 2008/0263550 A1* | 10/2008 | Su | G06F 17/30011 718/102 |
| 2010/0046044 A1 | 2/2010 | Ishizu et al. | |

FOREIGN PATENT DOCUMENTS

| | | |
|---|---|---|
| JP | 2006-031465 | 2/2006 |
| JP | 2008-172419 | 7/2008 |

* cited by examiner

*Primary Examiner* — Thomas D Lee
(74) *Attorney, Agent, or Firm* — Oblon, McClelland, Maier & Neustadt, L.L.P.

(57) ABSTRACT

A document output system includes a document registration unit that registers, for each one of events, data of one or more documents in association with identification for identifying the event related to the documents in a memory, an acceptance unit that accepts an instruction for outputting the documents, the instruction including identification for identifying an event related to the documents to be output, and an output unit that outputs the documents associated with the identification of the instruction in a predetermined order as a series of the documents.

9 Claims, 8 Drawing Sheets

FIG. 4

| MEETING ID | DATE | MEETING NAME | REMARKS | # OF ATTENDEES | # OF OUTPUT TIMES |
|---|---|---|---|---|---|
| 1 | JANUARY 1 | MEETING 1 | RE: THEME A | X | m |
| 2 | FEBRUARY 2 | MEETING 2 | RE: THEME B | Y | n |

FIG. 5

| DOCUMENT ID | MEETING ID | DOCUMENT NAME | REGISTRATION DATE/TIME | OUTPUT FORMAT |
|---|---|---|---|---|
| 1 | 1 | AAA | MARCH 1, 2014 12:00 | B/W, DUPLEX, COMBINE 2 ORIGINALS, NO STAPLING |
| 2 | 1 | BBB | MARCH 2, 2014 16:30 | COLOR, DUPLEX, COMBINE 4 ORIGINALS, STAPLING |
| 3 | 2 | CCC | MARCH 1, 2014 11:15 | B/W, SINGLE SIDED, NO COMBINING, NO STAPLING |
| 4 | 2 | DDD | MARCH 1, 2014 15:00 | COLOR, DUPLEX, COMBINE 2 ORIGINALS, STAPLING |

PLEASE SELECT MEETING THAT MATERIAL IS USED.

MEETING 1, JANUARY 1, RE: THEME A
MEETING 2, FEBRUARY 2, RE: THEME B

MATERIALS FOR MEETING 1, JANUARY 1, RE: THEME A

PLEASE SELECT MATERIAL TO PRINT AND PRESS START KEY.

MATERIAL 1, AAA
    MATERIAL 2, BBB

DOCUMENT OUTPUT METHOD FOR OUTPUTTING DOCUMENTS ASSOCIATED WITH AN EVENT

CROSS-REFERENCE TO RELATED APPLICATION

This patent application is based on and claims priority pursuant to 35 U.S.C. §119(a) to Japanese Patent Applications No. 2014-055113, filed on Mar. 18, 2014 and No. 2015-045981, filed on Mar. 9, 2015 in the Japan Patent Office, the entire disclosure of which is hereby incorporated by reference herein.

BACKGROUND

1. Technical Field

The present invention relates to a document output system, document output apparatus, and document output method.

2. Background Art

Conventionally, a technology has been proposed, in which documents used such as at meetings are preliminarily registered in a document management system and those documents are read from the document management system and printed out as needed.

SUMMARY

An example embodiment of the present invention provides a novel document output system that includes a document registration unit that registers, for each one of events, data of one or more documents in association with identification for identifying the event related to the documents in a memory, an acceptance unit that accepts an instruction for outputting the documents, the instruction including identification for identifying an event related to the documents to be output, and an output unit that outputs the documents associated with the identification of the instruction in a predetermined order as a series of the documents.

Further example embodiments of the present invention provide a document output method for the document output system.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 4 is a diagram illustrating a meeting information table as an embodiment of the present invention.

FIG. 5 is a diagram illustrating a document information table as an embodiment of the present invention.

DETAILED DESCRIPTION

Figure 1:
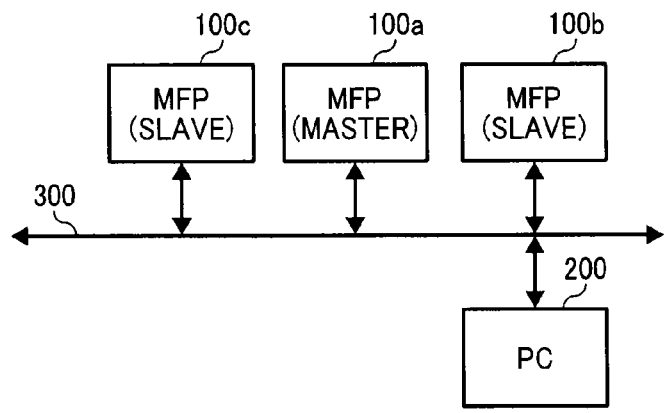
FIG. 1 is a diagram illustrating a configuration of an image processing system as an example of a document output system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In case of using documents in a meeting etc., if each attendee prints out the documents for himself/herself, those documents may be printed out in different formats, and that could prevent attendees from sharing common recognition. For example, if the outputting order of the documents is different depending on attendees, it is possible that each attendee refers to different document unless checking which document is to be referred next as needed using the document name etc.

These issues could arise similarly in case of outputting a document other than printing out.

In the following embodiment, it is possible to share common recognition of where to refer in the documents easily, no matter how the documents are output.

FIG. 1 is a diagram illustrating a configuration of an image processing system as an example of a document output system in this embodiment.

As shown in FIG. 1, in the image processing system, multiple MFPs 100a to 100c and a personal computer (PC) 200 are connected with each other to be communicable via a network 300.

Among them, each of the MFPs 100a to 100c corresponds to the image processing apparatus that can provide multiple functions such as scanning, printing, copying, and facsimile etc. It should be noted that it is unnecessary that all apparatuses include the same hardware, and it is possible that each apparatus can provide different functions.

In FIG. 1, the MFP 100a is used as a storing unit that registers a document input from each apparatus (including the MFP 100a itself). Therefore, the MFP 100a is referred to as "master" hereinafter. Other MFPs 100b and 100c can acquire data of documents registered in the MFP 100a from the MFP 100a and forms images on paper to output printed documents. The apparatuses that documents are not registered are referred to as "slave" hereinafter.

There are no particular differences in functions other than registering documents among the MFPs 100a to 100c at least within the following disclosure. Therefore, the MFPs 100a to 100c are collectively referred to as the MFP 100 if it is unnecessary to identify as an individual apparatus.

The PC 200 is an information processing apparatus for operating the MFP 100 externally. The PC 200 can transfer the document data to the MFP 100a to register the document data in the MFP 100a and instruct the MFP 100a to output the document. In addition, the PC 200 can instruct the MFP 100a to output the document as browsable data such as Portable Document Format (PDF) and acquire the output data. The PDF is one example of output format of the registered document.

The network 300 can be either wired or wireless. It is also possible that a distant apparatus is connected via the internet.

Figure 2:
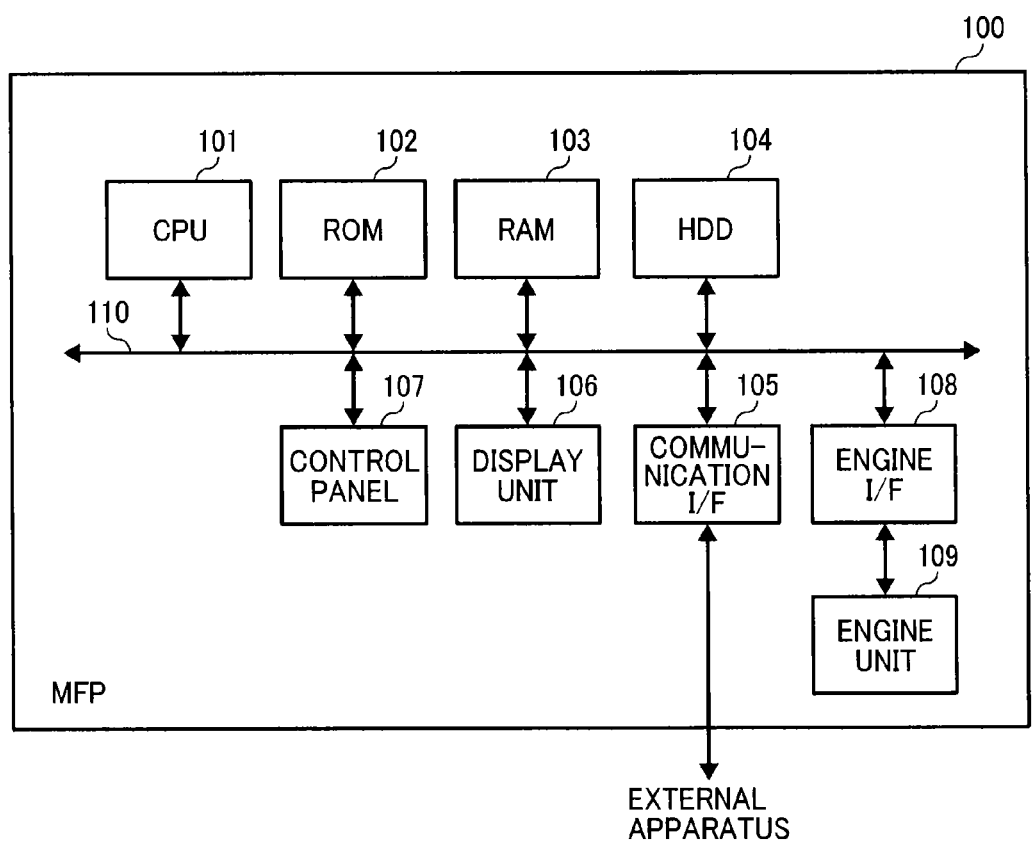
FIG. 2 is a diagram illustrating a hardware configuration of a multifunction peripheral (MFP) in FIG. 1 as an embodiment of the present invention.

FIG. 2 is a diagram illustrating a hardware configuration of the MFP 100 in this embodiment.

As shown in FIG. 2, the MFP 100 includes a CPU 101, a ROM 102, a RAM 103, a hard disk drive (HDD) 104, a communication interface (I/F) 105, a display unit 106, a control panel 107, and an engine I/F 108, and those components are connected with each other via a system bus 110. In addition, an engine unit 109 is connected to the engine I/F 108.

The CPU 101 controls the entire MFP 100 by executing a program stored in the ROM 102 or the HDD 104 using the RAM 103 as a work area, and various functions can be implemented.

The HDD 104 is a non-volatile recording medium (storing unit) and stores various programs to be executed by the CPU 101 and various data (described in detail later). In the MFP 100a, the HDD 104 also stores data of the documents that each apparatus asks to register.

The communication I/F 105 is an interface to communicate with external apparatuses such as other MFPs via the network 300.

The display unit 106 is a display that presents information for user.

The control panel 107 is an operational unit such as various keys, buttons, and a touch panel that receives user operation.

The display unit 106 and the control panel 107 can be external, and the MFP 100 can accept operation from an external terminal via the network.

The engine I/F 108 is an interface that connects the engine unit 109 to the system bus 110 so that the CPU 101 can control the engine unit 110.

The engine unit 109 is a mechanism that includes an image forming unit that forms an image on paper, an image scanning unit that scans an image on paper, a paper feeding unit that mounts paper on which an image is formed and feeds the paper, and the paper transferring unit that transfers paper to perform various operations other than communication and information processing. As described above, each apparatus can include different functions.

Regarding hardware, the PC 200 is a general-purpose computer that includes the CPU, ROM, and RAM etc.

Figure 3:
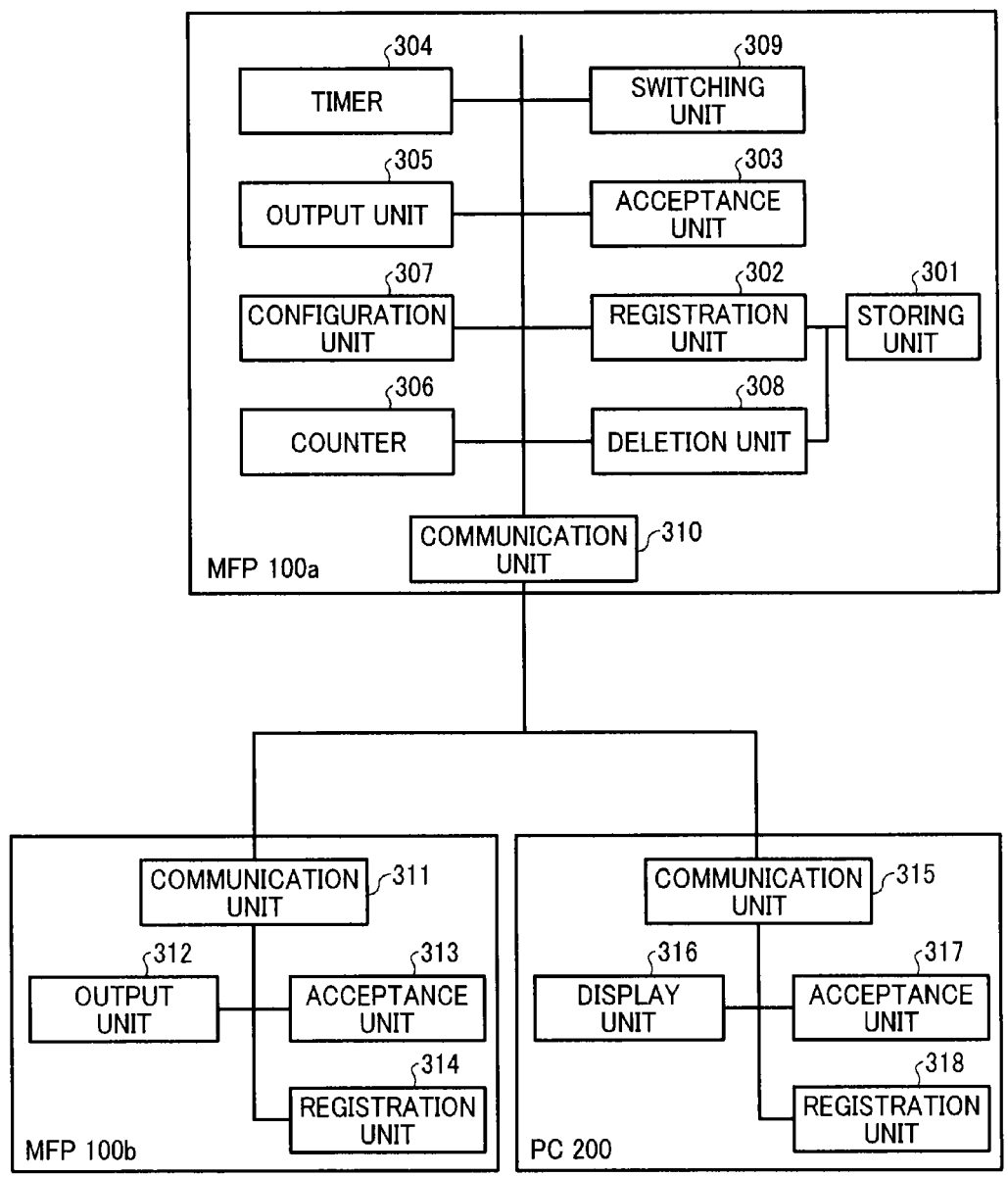
FIG. 3 is a diagram illustrating a functional configuration of each apparatus as an embodiment of the present invention.

FIG. 3 is a diagram illustrating a functional configuration of each apparatus in this embodiment. Each of the MFP 100a that includes a document registering function and the MFP 100b that utilizes the registered document are described below. In the description below, in describing each unit included in the image forming apparatus 100a, relationships to main units that implement each unit in the MFP 100a among the units shown in FIG. 2 is also described.

First, the MFP 100a includes a storing unit 301, a registration unit 302, an acceptance unit 303, a timer 304, an output unit 305, a counter 306, a configuration unit 307, a deletion unit 308, a switching unit 309, and a communication unit 310. The storing unit 301 is implemented by the ROM 102, the RAM 103, and the HDD 104 etc. The storing unit 301 stores various data such as the documents (electronic data such as document data and image data) and various information (e.g., information table etc.). The units other than the storing unit 301 are implemented by operating one or more elements in FIG. 2 in response to commands by the CPU 101 in accordance with the program stored in the ROM 102 or the HDD 104 etc.

The registration unit 302 registers the document and data regarding the document in the storing unit 301. The acceptance unit 303 accepts user input, user selection, or user instruction. The timer 304 counts time. The output unit 305 outputs the documents etc. stored in the storing unit 301. In this case, "output" includes the case where that an image is formed on a recording medium for output, and the case where a document is transferred to the other apparatus. The counter 306 counts the number of outputs by the output unit 305. The configuration unit 307 configures conditions in which the documents stored in the storing unit 301 are to be deleted (e.g., the number of outputs and time etc.). The deletion unit 308 deletes the document stored in the storing unit 301 if the conditions configured by the configuration unit 307 are satisfied. The switching unit 309 changes the conditions of deleting the documents configured by the configuration unit 307 and changes the conditions configured by the configuration unit 307 from invalid to valid and vice versa. The communication unit 310 transfers/receives data and information to/from the external apparatuses.

The MFP 100b further includes a communication unit 311, an output unit 312, an acceptance unit 313, and a registration unit 314.

The communication unit 311 transfers/receives data and information to/from the external apparatuses. The output unit 312 outputs the documents etc. stored in the storing unit 301 in the MFP 100a. As described above, "output" includes the case where that an image is formed on a recording medium for output, and the case where a document is transferred to the other apparatus. The acceptance unit 313 accepts user input, user selection, or user instruction. The registration unit 314 registers the document and data regarding the document in the storing unit 301 in the MFP 100a.

The PC 200 includes a communication unit 315, a display unit 316, an acceptance unit 317, and a registration unit 318.

The communication unit 315 transfers/receives data and information to/from the external apparatuses. The display unit 316 displays images of the documents stored in the storing unit 301 in the MFP 100a. The acceptance unit 317 accepts user input, user selection, or user instruction. The registration unit 318 registers the document and data regarding the document in the storing unit 301 in the MFP 100a. For example, the communication unit 315 corresponds to a network interface such as a network interface circuit. The display unit 316 corresponds to a display such a liquid crystal display. The acceptance unit 317 corresponds to any desired user interface such as a keyboard, mouse, touchpanel, etc. The registration unit 318 corresponds to a processor such as a CPU.

Using the image processing system described above, the function of registering and outputting the documents is described below in detail.

First, a method of managing the documents registered in the MFP 100a is described below with reference to FIGS. 4 and 5. In the MFP 100a, the registered documents are managed in association with information regarding meetings using a meeting information table shown in FIG. 4 and a document information table shown in FIG. 5.

The meeting information table shown in FIG. 4 is a table that registers information on meetings. In the meeting information table, meeting ID, date, meeting name, remarks, number of attendees, and the number of output times are registered.

Among them, the meeting ID is identification information for identifying a meeting. It is possible that any event other than the meeting can be specified using ID. It is thus possible to designate the ID for identification depending on the purpose of use of the registered document.

The date information indicates a date when the meeting is held. As described later, it is possible that the registered document is deleted automatically after the date when the corresponding meeting is held. The date information is used as a criterion for deleting the registered document. While the date information is set in units of day in this embodiment, it is possible to configure the date information in units of hour, minute, or second.

The meeting name and the remarks are character strings that indicate content of the meeting and displayed when the meeting is selected by user operation.

The meeting information table shown in FIG. 4 also includes the number of attendees of the meeting. As described later, it is possible that the registered document is deleted automatically after it is output for the number of times that is equal to the number of attendees. Therefore, the number of attendees is used as a criterion for deleting the registered document.

The number of output times indicates how many times the material regarding the corresponding meeting has been output. The number of output times is updated automatically when the document is output by user operation after identifying that meeting.

It is possible that the content of the meeting information table is edited except for the number of output times arbitrarily by user operation. It is also possible to add a new meeting or delete an existing meeting. Alternatively, the MFP 100a may not be operated directly. In such case, the MFP 100b, the MFP 100c, or the PC 200 may access the MFP 100a to edit the meeting information table. As described above, any apparatus that is used to edit information functions as a configuration unit.

FIG. 5 is a diagram illustrating a document information table that information on the document registered in the MFP 100a is registered in this embodiment. In the document information table, document ID, meeting ID, document name, registration date/time, and output format s are registered.

Among them, the document ID is identification information for identifying a document.

The meeting ID is identification information that indicates a meeting corresponding to the document. By registering the document in folder allocated to each meeting, it is possible to use identification information of the folder as the identification information for identifying the meeting.

The document name is a character string for display, which indicates the name of the document.

The registration date indicates date when the document is registered. In outputting documents, documents associated with one meeting ID are output sequentially in chronological order with reference to the registration date/time.

The output format indicates configurations such as color or monochrome, duplex printing, combine printing, and/or stapling to be used in outputting a document. It is unnecessary to include configuration information for all items described above. Regarding items whose configuration information is registered, the configured information is not changed when outputting the document. Regarding items whose configuration information is not registered while the configuration information is registerable, it is possible to configure the configuration information arbitrarily when outputting the document.

In the document information table described above, information regarding a document is created automatically when registering the document, and after that, it is not basically allowed to edit the information by user operation. In case of deleting the registered document, the information on the document is deleted from the document information table.

Figure 6:
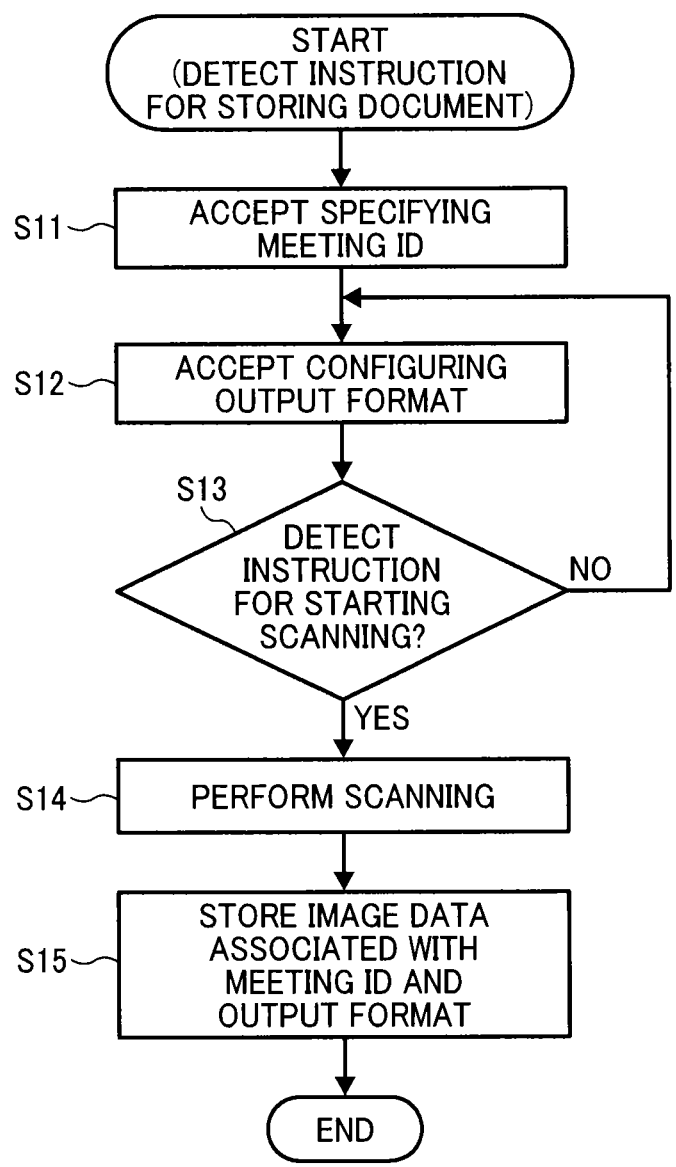
FIG. 6 is a flowchart illustrating a process of registering a document performed by the MFP in FIG. 1 as an embodiment of the present invention.

FIG. 6 is a flowchart illustrating a process of registering a document performed by the MFP 100 in this embodiment. The CPU 101 executes the process in case of detecting an instruction for storing a document.

In FIG. 6, first, the CPU 101 receives information indicating a meeting ID to be associated with a document to be registered in S11. To allow a user to input the information, the MFP 100 may display a screen in FIG. 7 and accept selection of the meeting associated with the document to be registered. Through the screen in FIG. 7, the user may create a new meeting.

Next, the CPU 101 receives configuration of output format to be used for outputting the document in S12. In this case, the CPU 101 also accepts configuring the document name if necessary. For example, it is possible to accept the configuration such as for printing using a general-purpose user interface (UI) provided for the MFP. In case of enabling a configuration "format is not set", the CPU 101 prepares a UI for accepting that configuration.

Next, the CPU 101 repeats steps S12 and S13 until an instruction for starting scanning is detected. After detecting the instruction of starting scanning, images on a document mounted on a document holder are scanned using the scanner and the image data of the document is acquired in S14.

After that, the CPU 101 instructs the MFP 100a as the registration destination to register the image data acquired by scanning, the meeting ID specified in S11, and the output format specified in S12 in association with one another in S15, and the operation ends.

In response to the instruction, the MFP 100a stores the image data and registers the information on the image data in the document information table.

In case the PC 200 registers the document, the basic process flow is the same as described above except that the data of the document to be registered is acquired by not scanning the document but reading the data from the HDD or generating print data etc.

Figures 7, 8:
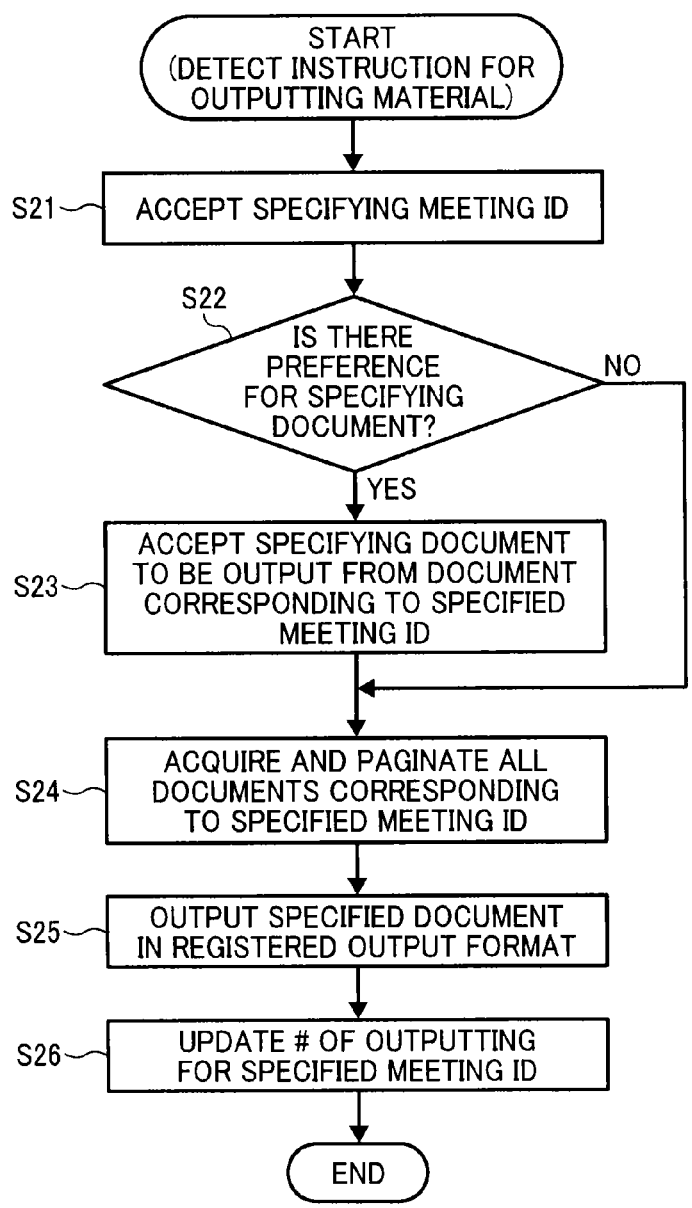
FIG. 7 is a diagram illustrating a screen that accepts selecting a meeting associated with a document to be registered as an embodiment of the present invention.
FIG. 8 is a flowchart illustrating a process of outputting a document performed by the MFP as an embodiment of the present invention.

FIG. 8 is a flowchart illustrating operation of outputting a document performed by the MFP 100 in this embodiment. The CPU 101 executes the process when detecting an instruction for outputting a document.

In FIG. 8, first, the CPU 101 receives a meeting ID that indicates a meeting associated with a registered document to be output in S21. In the acceptance described above, the data of the meeting information table shown in FIG. 4 is acquired from the MFP 100a if necessary.

Next, the CPU 101 determines whether or not it is requested to output a document among documents associated with the specified meeting in S22. If there is no document that is requested for output, all of corresponding documents are output. By contrast, if there is any document that is requested for output, the CPU 101 receives identification of a document to be output among documents corresponding to the specified meeting ID. At S22, the data of the meeting information table shown in FIG. 4 and the document information table shown in FIG. 5 is acquired from the MFP 100a if necessary.

Figures 9, 10:
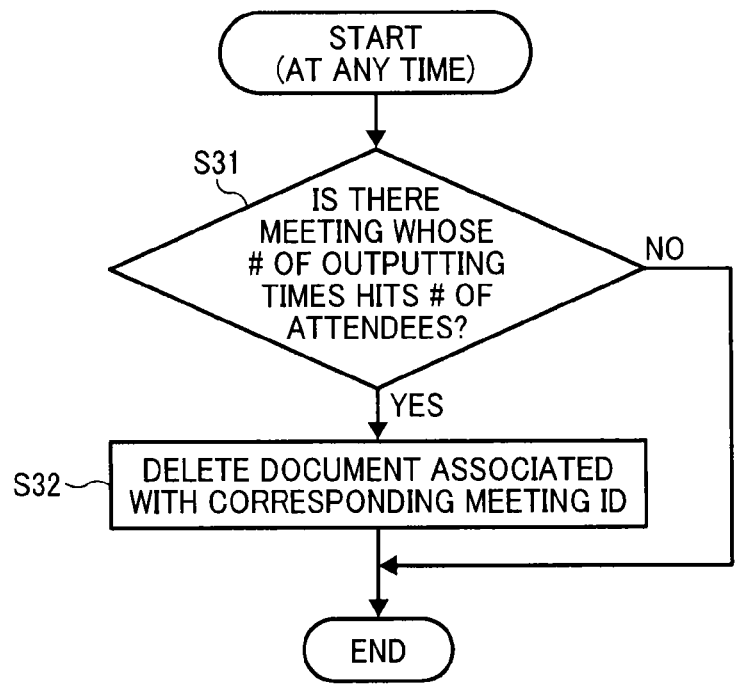
FIG. 9 is a diagram illustrating a screen that accepts selecting a document to be printed out as an embodiment of the present invention.
FIG. 10 is a flowchart illustrating a process of deleting a document automatically performed by the MFP as an embodiment of the present invention.

It is possible to accept the identification of the document in S23 using a screen shown in FIG. 9 for example. In the screen shown in FIG. 9, it is possible to specify the arbitrary number of documents to be output by user operation. In some cases, it is wasteful to output all documents if some materials are added later or in case of joining a meeting halfway and some materials have already been referred. It is possible to specify the document to be output in those cases.

In either case, the CPU 101 subsequently acquires data of all documents corresponding to the meeting ID specified in S21 and paginate those documents with sequential page numbers. The step described above is performed in case either that the documents are specified or that the documents are not specified in S23. If multiple documents are to be output, they are arranged in order of older registration date/time (i.e., document with older registration date/time comes first) for example. While it is possible to use other criterion, it is determined that their outputting order do not change each time the documents are output. In case of adding some materials, it is desirable to use an algorithm that does not affect the arrangement of the existing materials. This process is executed so that the documents associated with the specified meeting ID are output as a series of documents. If the number of pages formed on one sheet is changed (e.g., combine printing is configured) by specifying the output format, it is possible to paginate the document so that a page number corresponds to a sheet reflecting the output format.

Next, the CPU 101 prints out the document to be output in accordance with the specification in S23 (all documents if there is no specification) in the output format registered for each document. In case of outputting only some parts of the documents, page numbers in the output documents are not serial. However, by combining them with other documents that have already been output, it is possible to acquire the output result with serial page numbers just like the case that outputs all the documents together.

After that, the CPU 101 instructs the MFP 100a to update the number of times the document is output that corresponds to the meeting ID specified in S21, thus adding the number of copies that are output this time, and the operation ends.

The MFP 100a that registers a document may execute the step in S24 at the timing of registering the document or other appropriate timings. In this case, the MFP 100 that outputs the document acquires data to be output only in accordance with the specification.

As described above referring to FIG. 8, documents associated with the specified meeting ID, selected from among the registered documents, are output as series in accordance with the user instruction to output the documents. Therefore, even if multiple users output documents by their own, the documents are output as the same serial documents, thus making it easier to refer to each output document. Accordingly, it is possible that users who bring those documents share common recognition of where to refer in the documents easily.

In addition, since the documents associated with the specified meeting ID are formed and output with the serial page numbers, in case of outputting many documents, it is possible to specify where to refer in the documents easily by instructing to refer to which number of pages in the documents. Especially, in case of referring to different documents alternately, it is possible to share common recognition of which document to refer and where to refer in the document among attendees.

In case of specifying the documents to be output, those documents are paginated in the same way as the case of outputting all documents corresponding to the meeting ID together, and all attendees can share documents with same page numbers even in case of outputting a part of the documents later or outputting the documents halfway.

Registered documents with specified output formats are output using the specified output formats while preventing modification of the output format. As a result, all attendees can share materials with same outlook and same number of pages, and it is possible to prevent from sharing materials with different outlook and different number of pages. This feature can also contribute to sharing common recognition of where to refer in the documents easily.

A process of deleting a document automatically is described below.

Figure 11:
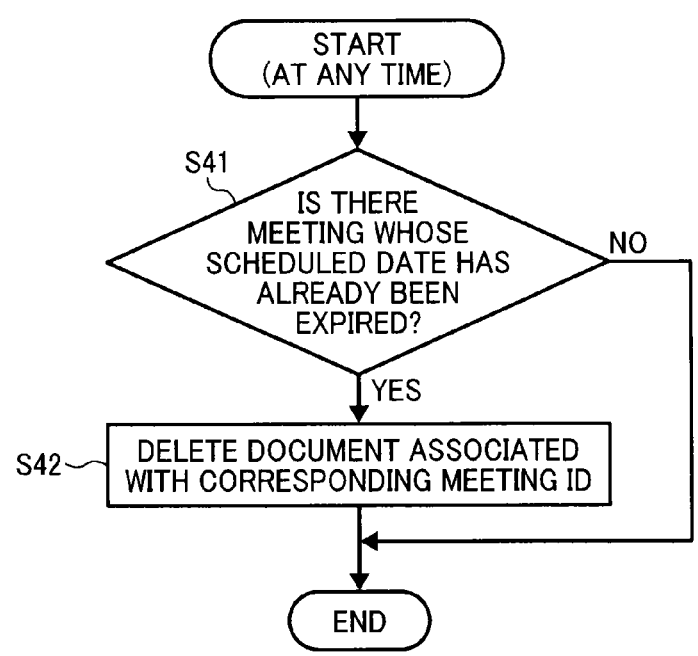
FIG. 11 is a flowchart illustrating another process of deleting a document automatically performed by the MFP as an embodiment of the present invention.

The CPU 101 in the MFP 100a performs processes shown in FIGS. 10 and 11 at any desired time.

In FIG. 10, first, the CPU 101 determines whether or not there is a meeting whose number of output times reaches the number of attendees in the meeting information table in FIG. 4 in S31. If so, all registered documents associated with the meeting ID are deleted in S32, and the process ends. In case of NO in S31, step S32 is not performed and the process ends.

As described above, if the registered document is output for the number of output times associated with the meeting ID corresponding to the document, it is possible to delete the registered documents. In case of the materials registered for the meeting, it is considered that it is unnecessary to output the material anymore after all attendees finish outputting the material. Therefore, by deleting the registering materials automatically in that case, it is possible to release the storage area without user intervention.

In FIG. 11, first, the CPU 101 determines whether or not there is a meeting whose date has already passed in the meeting information table in FIG. 4 in S41. If so, all registered documents associated with the meeting ID are deleted in S42, and the process ends. In case of NO in S41, step S42 is not performed and the process ends.

As described above, if meeting date associated with a meeting ID has already passed, it is possible to delete the registered documents associated with the meeting ID. In case of the materials registered for the meeting, it is considered that it is unnecessary to output the material anymore after finishing the meeting. Therefore, by deleting the registering materials automatically in that case, it is possible to release the storage area without user intervention. If the meeting date is considered as a criterion for the determination, it is possible to cope with a situation that the number of attendees changes.

Figure 12:
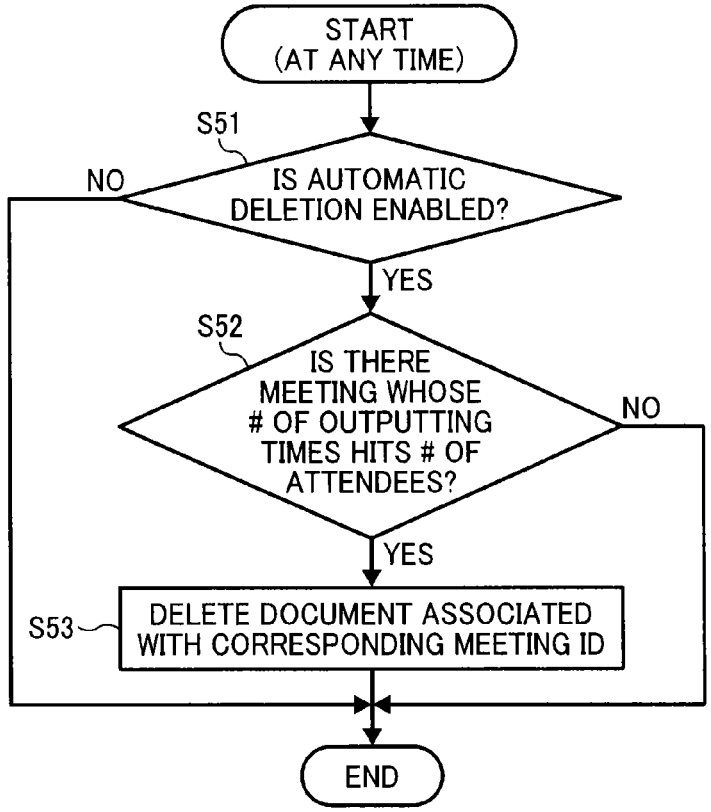
FIG. 12 is a flowchart illustrating yet another process of deleting a document automatically corresponding to FIG. 9 as an embodiment of the present invention.

It should be noted that it is possible to perform a process in FIG. 12 instead of performing the process in FIG. 10. In FIG. 12, first, the CPU 101 determines whether or not the automatic deletion is enabled in S51. If it is determined that it is enabled, just like the case in FIG. 10, all registered documents associated with the meeting ID of the meeting whose number of output times reaches the number of attendees are deleted in S52 and S53. If it is determined that it is disabled in S51, the process ends without performing following steps anymore.

As described above, it is possible to enable and disable the function of deleting the documents automatically in accordance with the number of print times. In configuring the automatic deletion, the CPU 101 functions as a switching unit. Regarding the process in FIG. 11, it is also possible to determine whether or not the deletion process is performed depending on the automatic deletion is enabled or disabled.

Consequently, it is possible to cope with cases that the documents are not to be deleted after the meeting and the meeting date has been changed, and it is possible to utilize the documents more flexibly.

In the present invention, specific configurations of units, processing sequence, handled data configuration and format, the number of apparatuses and functional roles etc. are not limited to the case described above in the embodiment.

Figure 13:
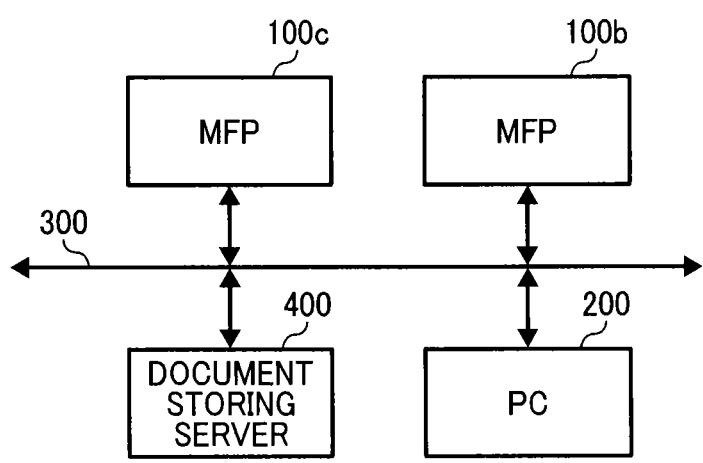
FIG. 13 is a diagram illustrating another configuration of the image processing system as an embodiment of the present invention.

For example, the MFP 100*a* that functions as the master includes the function of registering the documents in the embodiment described above. However, it is also possible to add a document storing server 400 separately from the MFP and to register the documents in the document storing server 400. FIG. 13 is a diagram illustrating another configuration of the image processing system in this case.

In addition, it is possible that the functions implemented by the MFP 100 and the PC 200 in the embodiment described above are distributed to multiple information processing apparatuses and the multiple information processing apparatuses that cooperate with each other to implement the functions similar to the MFP 100 and the PC 200. The multiple cooperating apparatuses consist of the information processing system in this embodiment. It is also possible that the document storing server 400 is included in the document output system. It is unnecessary to include the PC 200 in the document output system. Other apparatuses can be included in the document output system.

The present invention also encompasses a non-transitory recording medium storing a program that executes a document output method for the document output system. The document output method, performed by the document output system, includes the steps of registering, for each one of events, data of one or more documents in association with identification for identifying the event related to the documents in a memory, accepting an instruction for outputting the documents, the instruction including identification for identifying an event related to the documents to be output, and outputting the documents associated with the identification of the instruction in a predetermined order as a series of the documents.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. A document output system, comprising:
a memory to store, for each of a plurality of events, data of a plurality of documents in association with an identification identifying the event related to the documents, and, to store for each document of the plurality of documents, a document identifier in association with corresponding print settings; and
processing circuitry configured to
accept an instruction for outputting at least one document, the instruction including an input identification identifying an input event among the plurality of events, and accept, for the input event, selection of the at least one document of the plurality of documents associated with the input event, and
output the selected at least one document associated with the input identification identifying the input event included in the input instruction in accordance with the corresponding print settings.

2. The document output system according to claim 1, wherein the processing circuitry paginates the selected at least one document associated with the input identification to output sheets of the selected at least one document with serial page numbers.

3. The document output system according to claim 2, wherein, when the processing circuitry accepts the input instruction for outputting the at least one document,
the processing circuitry paginates the at least one document to be output with a same page number as in the case of outputting the at least one document as a part of a series of the documents.

4. The document output system according to claim 1, wherein the processing circuitry outputs the at least one document in an output format that is registered in association with the identification identifying the event related to the at least one document, without allowing modification to the output format.

5. The document output system according to claim 1, wherein the processing circuitry is further configured to:
configure a number of output times that the at least one document associated with the input identification are output, and
delete the at least one document from the memory when the at least one document is output for the number of output times associated with the input identification.

6. The document output system according to claim 1, wherein the processing circuitry is further configured to:
configure a deletion time when to delete the at least one document associated with the input identification, and
delete the at least one document from the memory when the deletion time associated with the identification has passed.

7. The document output system according to claim 1, wherein the processing circuitry is configured to delete, from the memory, the at least one document associated with the input identification based on one of a deletion time passing and a number of times the at least one document has been output.

8. A document output apparatus, comprising:
a memory to store, for each of a plurality of events, data of a plurality of documents in association with an identification identifying the event related to the documents, and, to store for each document of the plurality of documents, a document identifier in association with corresponding print settings; and processing circuitry configured to accept an instruction for outputting at least one document, the instruction including an input identification identifying an input event among the plurality of events, and accept, for the input event, selection of the at least one document of the plurality of documents associated with the input event, and output the selected at least one document associated with the input identification identifying the input event included in the input instruction in accordance with the corresponding print settings.

9. A method of outputting a document, comprising:

storing, in a memory for each of a plurality of events, data of a plurality of documents in association with an identification identifying the event related to the documents, and, to store for each document of the plurality of documents, a document identifier in association with corresponding print settings;

accepting an instruction for outputting at least one document, the instruction including an input identification identifying an input event among the plurality of events, and accepting, for the input event, selection of at least one document of the plurality of documents associated with the input event; and outputting the selected at least one document associated with the input identification identifying the input event included in the input instruction in accordance with the corresponding print settings.

\* \* \* \* \*